Jan. 23, 1968 M. L. AVIGNON ET AL 3,365,713

SELF-CENTERING CODER

Filed May 5, 1964 2 Sheets-Sheet 1

Inventors
MICHEL L. AVIGNON
ANDRÉ L. T. LEMAIRE
By Percy P. Lantzy
Attorney

Jan. 23, 1968 M. L. AVIGNON ET AL 3,365,713

SELF-CENTERING CODER

Filed May 5, 1964 2 Sheets-Sheet 2

Inventors
MICHEL L. AVIGNON
ANDRÉ L. T. LEMAIRE
By Percy P. Lantzy
Attorney

United States Patent Office 3,365,713

Patented Jan. 23, 1968

3,365,713

SELF-CENTERING CODER

Michel Louis Avignon, Neuilly, and André Louis Théophile Lemaire, Paris, France, assignors to International Standard Electric Corporation, New York, N.Y., a corporation of Delaware Filed May 5, 1964, Ser. No. 364,920
Claims priority, application France, May 6, 1963, 933,761, Patent 1,366,812
10 Claims. (Cl. 340—347)

ABSTRACT OF THE DISCLOSURE

In a feedback type encoder including a register, under control of a clock, to provide a code representation of an analog signal, and an amplitude comparator to compare the analog signal, the decoded output of the register and a reference voltage, a centering arrangement activated during a calibration time, defined by the clock, to encode a calibration voltage, such as zero corresponding to the midpoint of the encoder operating range. The binary condition of the most significant digit of the coded calibration voltage develops a control signal that adjusts the value of one of the quantities coupled to the comparator, such as the reference voltage, to properly center the operation of the encoder.

The present invention concerns improvements to feedback encoders, in order to better the accuracy thereof.

It is known that analog to digital conversion may be carried out either by means of time modulation, or by feedback methods. The first method is characterized by a variable coding time, which is proportional to the value of the quantity to be coded, and the second one, by a constant coding time, which is proportional to the number of digits of the code.

The present invention concerns this last type of encoder in which distinction is made between the comparison coders and the subtraction coders. These coders are described in particular in the book "Notes on Analog-Digital Conversion" by A. K. Susskind (publication MIT), pages 5.54 to 5.60. This book will be further on referenced by (*a*).

In the following description, a description of the invention in its application to a comparison coder will be given by way of a non-limitative example. In this type of feedback coder, a register of capacity $2^n-1$ numbers, which is coupled to a decoder delivering a voltage *ed* representing the analog value of the number stored in the register, is available for encoding a signal of amplitude $v$ into a number of $n$ digits. The operation processes in $n$ time slots successively assigned to the determination of the $n$ digits of the code, the first time slot being reserved to the determination of the most significant digit, the second time slot to the determination of the next less significant digit, etc.

The register being initially cleared, the flip-flop of the most significant rank or flip-flop of rank 1 is set in the 1 state, and the voltage *ed* delivered by the decoder is compared to the signal to be coded. If $v-ed>0$, the most significant digit is 1, and the state of the flip-flop of rank 1 is not modified. If $v-ed<0$, the digit of rank 1 is 0, and the said flip-flop is reset to the 0 state.

The same operation is carried out at the next time slot, after setting the flip-flop of rank 2 to the 1 state. The different digits of the code are successively determined in this way and, at the end of the $n$th time slot, the number corresponding to the voltage $v$ is available, in parallel form, in the register. The code may also be obtained in serial form by using, at each time slot, the signal which characterizes the sign of the difference between the compared voltages.

In such a coder—as well as in all other types of coders—a same number N*o* must be obtained which will be called "checking code" each time that a given voltage $v_0$ is encoded. This does not happen in practice, owing to the variations of the D.C. voltages added to the analog signal to be coded, and to the variations of the characteristics of the components, so that the number obtained differs by a certain quantity ΔN from the rated value N*o*. One understands that the accuracy of the encoder increases when the maximum value of the deviation ΔN decreases.

In the present invention, the deviation is reduced by means of a feedback loop wherein, after having determined the sign of the deviation obtained during the coding of the calibration voltage $v_0$, the amplitude of one of the D.C. voltages involved in the coder is corrected in relation with this information, the direction of this correction being such that the deviation should be reduced. This operation will be hereafter called: centering correction of the coder.

The amplitude $v_0$ of the calibration voltage ranges between zero and Ec, which are the voltages which define the coding range. When the checking code which must correspond to this value of the signal is determined, one obtains the sign of the deviation by comparison or by subtraction. In the particular case where $$v_0=\frac{Ec}{2}$$

the checking code N*o* (which comprises $n$ digits), may take one of the two values $2^{n-1}-1$ or $2^{n-1}$. As all the numbers of value lower than or equal to $2^{n-1}-1$ have a digit of rank 1 equal to 0, and all the numbers of value higher than or equal to $2^{n-1}$ have a digit of rank 1 equal to 1, the sign of the deviation is obtained by examining the value of said digit.

The object of the present invention is thus to correct periodically the centering of a feedback coder in order to suppress the effect of the variations of the voltages involved, and of the characteristics of the components upon the value of the code which constitutes the output information.

The invention will be particularly described with reference to the accompanying drawings in which:

FIGS. 1(*a*) to 1(*f*) illustrate the different symbols used in FIG. 3;

Figure 1A:
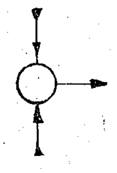
Figure 1B:
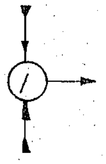
Figure 1C:
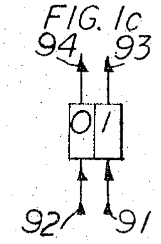
Figure 1D:
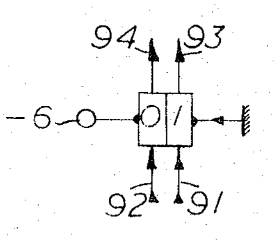
Figure 1E:
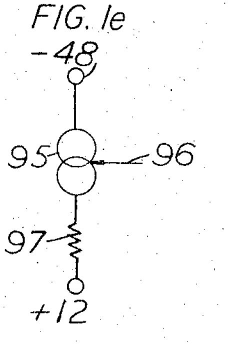
Figure 1F:
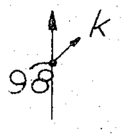
Figure 2:
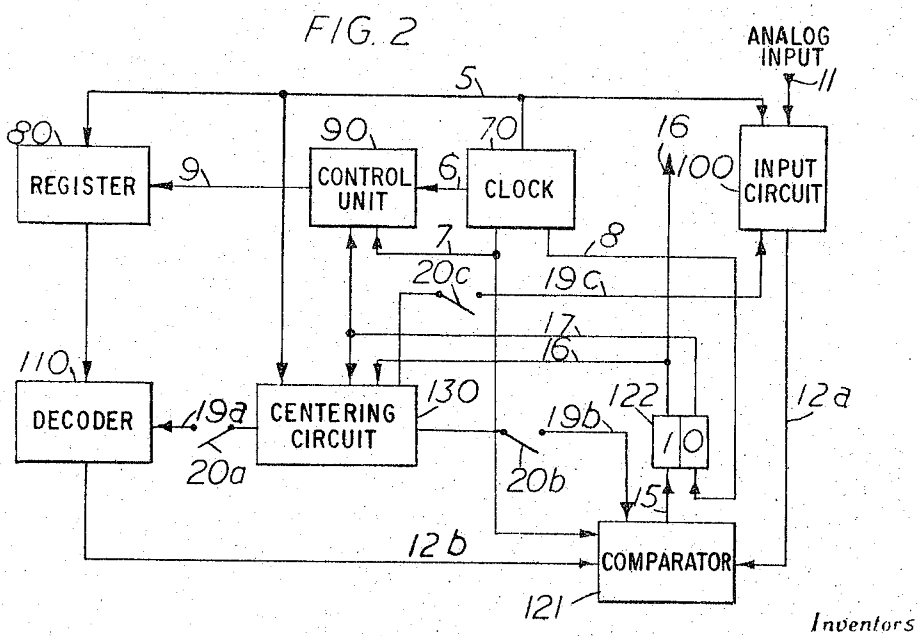
FIG. 2 illustrates the general diagram of a comparison coder with the periodical centering correction device.
Figure 3:
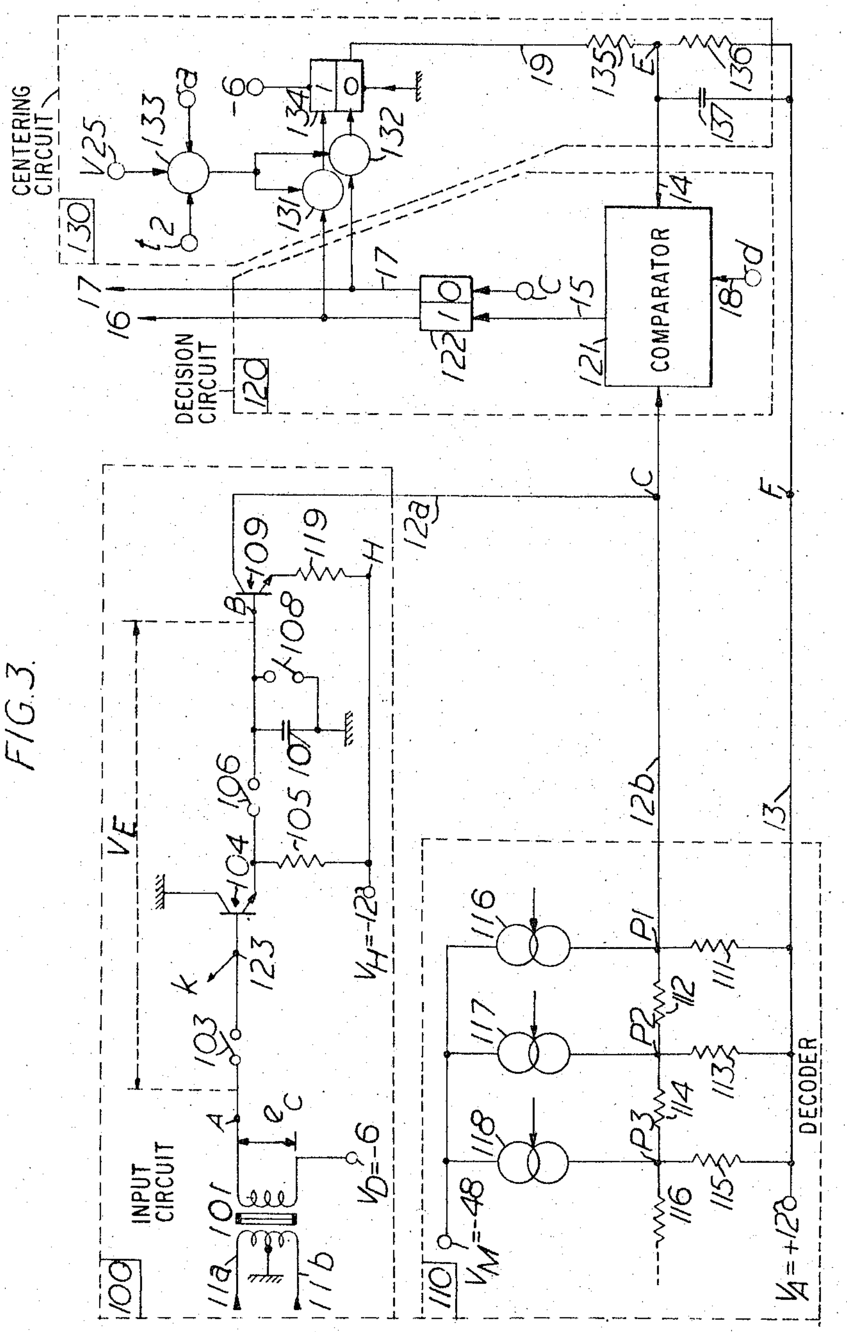
FIG. 3 illustrates the detailed diagram of certain constitutive circuits of a feedback encoder with periodical centering correction.

Before undertaking the description of the invention, the meaning of the symbols used in FIG. 3 are defined as follows:

FIG. 1(*a*) represents an AND circuit;

FIG. 1(*b*) represents an OR circuit;

FIG. 1(*c*) represents a bistable-circuit or "flip-flop" to which is applied a control signal on one of its input terminals 91 or 92 in order to set it respectively to the state 1 or to the state 0. A voltage of same polarity as the control signals is present either on the output terminal 93 when the flip-flop is in the 1 state, or on the output 94 when it is in the 0 state;

FIG. 1(*d*) represents the same flip-flop as the one of FIG. 1(*c*) but this symbol is different from the preceding one because the values of the supply voltages which are −6 v. and zero volt (ground potential) have been shown. The flip-flop is equipped with PNP transistors, this being shown symbolically by the arrow carried by the supply input connected to the ground terminal, the direction of the arrow being that commonly adopted in the representation of the emitter of a PNP transistor. In such a flip-flop, the signal on the output terminal 93 has an amplitude of −6 v. when the flip-flop is in the 1 state, and a zero volt amplitude when it is in the 0 state and that a negative signal of amplitude −6 v. controls the setting to the 1 state when it is applied to the input terminal 91;

FIG. 1(*e*) represents a current generator 95 controlled by the application of an activation signal on its input terminal 96 and which supplies a current in the resistance 97; and FIG. 1(*f*) represents a multiplexed conductor. In the example of the figure, *k* output conductors are connected to the same input conductor 98;

FIG. 2 illustrates the general diagram of a comparison coder including the centering device according to the invention. The coder itself includes the following elements.

The clock 70 which delivers the following signals:

(a) coding time slot signals defining the time interval reserved to the coding of a *n* digit number (signals appearing on the output conductor 5);
(b) digit time slot signals *t*1, *t*2 . . . *tn* defining, inside each coding time slot, *n* equal time slots (signals appearing on the output conductor 6);
(c) basic time slot signals defining, inside each digit time slot, a certain number of time intervals. The output conductors 7 and 8 on which two of these signals appear, the signal on conductor 7 preceding the signal on conductor 8, have been shown on FIG. 2.

The register 80 including *n* flip-flops, cleared at the beginning of each coding time slot on conductor 5, and the decoder 110 coupled thereto. This decoder delivers, on conductor 12*b*, an analog signal of amplitude *ed* corresponding to the number stored in the register.

The input circuit 100 which receives on its terminal 11 the signal to be coded of amplitude *v*. This circuit includes, in particular, a storage capacitor which is charged, at the beginning of the operation, at the voltage *v*, and which must remain charged to this value during the whole coding time, controlled by the coding time slot signal applied to it on conductor 5. The output signal on conductor 12*a* of this circuit also has a value *v*.

The comparator 121 which delivers a signal on its output conductor 15 when the signals *v* and *ed* applied at its input conductors 12*a* and 12*b* satisfy the inequality $v-ed>0$. This comparator is activated by a signal on conductor 7.

The decision flip-flop 122 reset to the 0 state at each digit time slot by a basic time slot signal on conductor 8 and which is set to the 1 state if the comparator 121 delivers a signal on its output conductor 15. The setting to the 1 state of this flip-flop (signal on the output conductor 16) means therefore that the digit corresponding to this digit time slot is 1.

The control unit 90 which receives, first, the time slot signals on conductors 6 and 7, and, second, the signal on conductor 17 (flip-flop 122 in the 0 state) controls, in relation with these signals, the setting of the different flip-flops of the register 80.

As it has been seen previously, that the register 80 is cleared at the beginning of the coding time slot and the flip-flop of rank 1 therein is set in the 1 state at the digit time slot *t*1; this operation being controlled by the basic time slot signal on conductor 7. The corresponding number is decoded, compared to the voltage *v* and the state of the flip-flop 122 indicates the value of the digit of rank 1. In the case where this digit is 0, the signal on conductor 17 controls the resetting to the 0 state of the flip-flop of rank 1. The time slot signal *t*2 selects the flip-flop of rank 2 which is set to the 1 state under the action of the signal on conductor 7, and the operation described hereabove is repeated once more.

The centering correction system according to the invention includes the centering circuit 130 having two of its inputs coupled to conductors 16 and 17, which are connected, respectively, to the output terminals 1 and 0 of the flip-flop 122, is activated by a particular coding time slot signal, or "calibration time slot," during which the signal $v_0$ is applied on the input terminal 11 of the coder.

As it has been seen previously, the sign of the deviation is obtained by comparing the coding number, during this calibration time slot, to the checking code. It has also been seen that, if one chooses $$v=\frac{Ec}{2}$$

this sign is given by the value of the digit of rank 1 of the code number, this information being made up by the presence of a signal, just at the end of the digit time slot *t*1, on one of the input conductors 16 or 17 of the centering circuit. The value of this digit determines the direction of the correction of the value of one of the D.C. voltages involved in the encoder.

This correction may act upon the reference voltage source which supplies the decoder 110 through the conductor 19*a* with switch 20*a* closed. It may also act upon either a D.C. voltage present in the comparator 121 through conductor 19*b* with switch 20*b* closed, as will be the case in the example described in relation with FIG. 3 or upon the D.C. level in the input circuit 100 through conductor 19*c* with switch 20*c* closed.

A method of utilizing the invention given, by way of a non-limitative example, will be described now. It concerns a coder associated to a pulse code modulation multiplex transmission system in which the signal to be coded is a periodical signal of peak to peak maximum amplitude Ec and of instantaneous value *ec* which, for a sinusoidal signal of angular frequency $\omega$, would be:

$$ec=\frac{Ec}{2}\cos\omega t$$

This system comprises twenty-five communication channels on which messages made up of eight digit codes are sequentially transmitted. Each frame period of the system is thus divided into 25 coding time slot signals or "channel time slot signals" V1 to V25 of equal duration and each of said time slots into 8 digit time slot signals *t*1 to *t*8. Each one of the latter is divided into four basic time slots of equal duration *a, b, c, d*.

The time slot V25 is reserved for the transmission of a synchronizing code combination and the time slot *t*8 for the transmission of a "guard digit," these two informations being generated outside of the decoder. Therefore, there is no coding during the time slot V25 and the register (register 80 of FIG. 2) comprises seven flip-flops.

FIG. 3 illustrates the detailed diagram of some of the constitutive circuits of this coder in which the elements corresponding to those of FIG. 2 bear the same reference.

The circuits shown on this figure are the following:

The input circuit 100;
A part of the decoder 110;
The decision circuit 120 (grouping the elements 121 and 122 of FIG. 2);
The centering circuit 130.

The circuit 110 is a decoder including a ladder attenuator which is described in pages 5.29 to 5.32 of the book referenced (*a*). The elements used for the decoding of the digits of rank 1, 2 and 3 and which include resistors 111, 112, 114, 116 of value R, resistors 113 and 115 of value 2R, and the current generators 116, 117 and 118, have been shown on this figure. This decoder is characterized by the fact that the impedance RS measured between its output terminals 12*b* and 13 is constant whatever may be the number of sections of the attenuator.

When this circuit 110 is a linear decoder, a current of amplitude I is injected at the point P1 if the digit of rank 1 of the number to be decoded is 1, at the point P2 if the digit of rank 2 is 1, etc. In the copending U.S. application, Ser. No. 341,035, filed Jan. 29, 1964, now U.S. Patent No. 3,298,017, issued Jan. 10, 1967, there is described a non-linear decoder wherein the addition of the currents is carried out in an analog way and which delivers an output voltage representing the analog value of the number present in the register 80 (FIG. 2).

When such a decoder is used in a feedback encoder which includes the centering correction device according to the invention, it is connected to the register 80 in such a way as to deliver, between the points C and F, an output voltage representing the analog value of the complement of the number in a said register. If the difference between the voltages decoded respectively for the numbers zero and $2^n-1$ is referenced E*d* and if the analog value of the number actually in the register 80 is referenced *ed*, the potential difference between the terminals 12*b* and 13 which are assumed to be disconnected from the remaining of the circuit is: $V''CF=ed-Ed$.

The decision circuit 120 includes the elements 121 and 122 described in relation with FIG. 2.

The centering circuit 130 includes, in particular, the correction flip-flop 134 which stores the sign of the correction, and the correction capacitor 137.

The operation of the input circuit will be first described. In the case of the example, the signals to be coded are received on the balanced line 11*a*–11*b* and transmitted to the storage capacitor 107 after addition to a voltage VD. The connection between the line conductors and this condenser includes the transformer 101, the electronic gate 103 belonging to the line considered and which fixes the boundaries of the channel time slot reserved to the connection of this line to the coder, the multiplexing 123 which means that *k* lines are multiplied on the base of the buffer transistor 104 having a voltage gain slightly different from 1 (transistor in common collector configuration) and the electronic gate 106 which fixes the boundaries of the time slot assigned to the charge of the capacitor 107. The switch 108, closed at the end of the channel time slot, discharges said capacitor.

Lastly, the NPN transitsor 109 which receives on its base the signal stored in the capacitor 107, comprises an emitter resistor 119 referred to hereinbelow as R1, and in the collector a resistor made up by the equivalent impedance RS of the attenuator. If $\alpha$ designates the current gain of the transistor 109 in common base configuration, and if one chooses $R1=\alpha RS$, the variation of the collector potential is equal and of opposite direction to the variation of the base potential.

If:

$Ec=8$ v.: maximum peak to peak amplitude of the signal to be coded of instantaneous value *ec*;

$VD=-6$ v.: D.C. voltage superimposed on the signal *ec*;

$VE=1$ v.: voltage drop between the points A (secondary of the transformer 101) and B (base of the transistor 109);

$VA=+12$ v.: supply voltage of the collector of the transistor 109 and of decoder 110;

$VH=-12$ v.: supply voltage of the emitters of the transistors 104 and 109; and $V1=D-VE$.

The potential at the base of the transistor 109 with respect to the point H is: $ec+VD-VE=ec+V1$. With the chosen values, this potential is always positive, so that the transistor 109 is conducting.

The potential difference between the points C (transistor collector) and F (voltage supply VA) due to the contribution of the input circuit is then:

$$V'CF=-(ec+V1+VH)=-(ec+V1+A)$$

as $VH=-VA$.

Since the contribution of decoder 110 is, as it has been seen previously: $V''CF=-Ed+ed$, the resulting potential difference between the points C and F is then:

$$VCF=V'CF+V''CF=(-Ed+ed)$$
$$-(ec+V1+A)=(\quad - \quad)-(Ed+V1+VA) \quad (1)$$

For:

$$ec=0\colon\ ed=\frac{Ed}{2}$$

Equation 1 may be written in the following form:

$$VCF=\left[\left(ed-\frac{Ed}{2}\right)-ec\right]-\left(\frac{Ed}{2}+V1+VA\right)$$

and, by setting:

$$\frac{Ed}{2}+V1+VA=Vx \quad (2)$$

$$VCF=\left[\left(ed-\frac{Ed}{2}\right)-ec\right]-Vx \quad (3)$$

The term between the brackets is equal to zero, to the nearest quantum, when the number stored in the register represents the numerical value corresponding to *ec*.

This voltage VCF is applied to the decision circuit 120 in which the comparator 121 is activated during the basic time slot *d* (activation signal on conductor 18) and the decision flip-flop 122 is reset to the 0 state at each basic time slot *c*. The comparator 121 comprises two inputs coupled to conductors 12*b* and 14, to which are applied, respectively, the voltage VCF given by Equation 3 and a voltage VR, the rated value of which, measured between the points E and F, is —V*x*.

Therefore, when the term between brackets has a value equal to zero (to the nearest quantum), the comparator must deliver no signal at all, this being written:

$$\left(ed-\frac{Ed}{2}+ec\right)-Vx+VR=0 \quad (4)$$

In practice, this element is achieved in such a way as to deliver, on its output conductor 15, a signal having such an amplitude as it may set the flip-flop 122 to the 1 state when the signal *ec* is more positive than the signal $$\left(ed-\frac{Ed}{2}\right)$$

A signal on conductor 15 appears for the condition:

$$\left(ed-\frac{Ed}{2}+ec\right)-Vx+VR<0$$

The operation time slots of the circuits shown on FIG. 3 will now be defined by way of a non limitative example.

If, for instance, the gate 103 is closed at the channel time slot V1, and the gate 106 during each time slot *b*, the capacitor 107 remains charged, during the time slots *c* and *d*, and it is discharged at the time slot *a* of the next basic time slot by the closing of the switch 108. If for instance, one considers the time slot *t*1 (coding of the digit of rank 1), the voltage VCF is compared to the voltage VR during the time slot *t*1.*d* during which the comparator 121 is activated. The signal on conductor 15 appears, eventually, in *t*1.*d* so that the state of the flip-flop represents the value of the digit of rank 1 during the time slots *t*2.*a* and *t*2.*b*.

By examining the Equations 2 and 4, it is seen that the D.C. voltages involved in the coding are the voltages E*d*, V1, VA, VR, to which must be added the voltage VH which does not appear in these equations since $VH=-VA$. If one or several of these voltages vary, the number obtained for the encoding of the same signal will also vary as it has been seen previously. Thus, in the case of the non-linear encoder described in the patent application quoted hereabove, the value of a quantization interval in the range of the small amplitudes is 3 millivolts, so that a very small variation of only one of the quoted voltages initiates a substantial deviation.

As it has been indicated during the study of FIG. 2, the voltage corresponding to the middle point of the range is chosen as calibration voltage $v_0$. In the case of the PCM communication system chosen by way of example, this voltage corresponds to a voltage *ec* of zero amplitude. The correction will be made on the voltage VR applied to the comparator 121 through conductor 19*b* with switch 20*b* closed (FIG. 2).

Last, in the circuit shown on FIG. 3, the channel time slot V25 during which there is no signal to be coded, is chosen as calibration time slot.

One of the *k* lines connected to the multiplexing 123 is then used as a dummy line by connecting a resistance of suitable value instead of a secondary winding of transformer 101, and this line is switched on at the time slot V25 so that the voltage to be coded at this time slot is $ec=0$, as required.

The information concerning the value of digit of rank 1 of the code obtained, is available in the decision flip-flop 122 at the end of the time slot *t*1.*d* (basic time slot *d* of the digit time slot *t*1), and it is transmitted to the correction flip-flop 134 at the time slot *t*2.*a* of the calibration time slot V25 (AND circuit 133) by the activation of the AND circuits 131 and 132. This flip-flop is in the 1 state or in the 0 state starting at *t*2.*b* according to whether the digit of rank 1 of the number N*o* is 1 or 0.

The PNP transistors of the correction flip-flop 134 are coupled between the ground and the −6 v., so that, in accordance with the conventions set forth during the description of FIG. 1(*d*), the voltages between the output conductor 19 and ground are −6 v. when the flip-flop is in the 0 state and zero volts when it is in the 1 state.

The resistances 135 and 136 are connected in series between this output conductor 19 and the point F, their common point E being connected to the input conductor 14 of the comparator. The voltage between this point E and the point F is the reference voltage VR, and the ratio of the values of the resistances 135 and 136 is chosen in such a way that, if the conductor 19 was brought to a potential −3 volts (arithmetic mean value of the voltages delivered by the flip-flop 134), $VR=Vx$ and the Equation 4 would be satisfied, with a deviation $\Delta N=0$.

The correction capacitor 137, connected between the points E and F, is either charged or discharged through the resistance 136 during the changes of state of the flip-flop 134 so that the potential of the point E fluctuates on both sides of the mean potential V*x* in relation with the time constant of the circuit.

This time-constant is chosen sufficiently high in order that the variations ΔV of the voltage VR should be low between two consecutive calibration time slots. The optimum value of this variation is one quantization interval, so that the value of the numbers obtained for two successive encodings of the calibration voltage do not differ by more than one unit. In practice, the variation of the D.C. voltages may be higher than one quantization interval per frame period and, in this case, the value of the time constant must be higher than the maximum variation of the D.C. voltages in order to correct said variation.

It will be noted that, in the case of a non-linear encoder, the quantization interval to be considered is that in which the calibration voltage is placed.

In short, a voltage $ec=0$ is coded at each frame period, and the value of the reference voltage VR is modified in relation with the value of the digit of rank 1 of the code obtained. If the variation ΔV is higher than the value of a quantization interval, and steady state conditions are present, the reference voltage oscillates on both sides of the value V*x* and the peak to peak amplitude of this oscillation is ΔV.

During the energizing of the encoder, $VR=0$, and the flip-flop 134 is either in the 0 state, or in the 1 state. The capacitor 137 begins to charge to a negative voltage with respect to the point F.

At the time slot *t*1 of the first calibration time slot, a digit 1 is stored in the flip-flop of rank 1 of the register 80 (FIG. 2) and the decode voltage is *Ed*/2. Since $ec=0$ the Equation 4 becomes: $VR-Vx<0$. The determined digit is 1 so that, in *t*2.*a*, the flip-flop 134 sets to the 1 state and the capacitor 137 is supplied between −6 volts and +12 volts. During the next calibrations, the voltage VR continues to increase in absolute value, and the flip-flop 134 is always set to the 1 state, up to the time when $VR-Vx>0$. At this digit time slot, the digit of rank 1 is 0, and the capacitor is supplied between 0 volt and +12 volts, so that the voltage VR decreases in absolute value up to the next measurement, then oscillates on both sides of the value V*x*.

As it has been indicated during the study of FIG. 2, any value $v'_0$ may be chosen as calibration voltage. It is then sufficient to store the corresponding coded N′*o* in the register 80 (FIG. 2) at the beginning of the calibration time slot in order to obtain the information concerning the direction of the deviation.

In the example described in relation with FIG. 3 (application of the correction system to a PCM encoder), the operation of the gates 106 and 108 which control respectively the charge and the discharge of the storage capacitor 107, has been mentioned. Since this capacitor may keep its charge during the whole encoding time, it is realized that when the PCM system is operated at a high speed, a very short time slot is available in order to charge and to discharge the capacitor, and that these operations may be incomplete so that crosstalk may occur between two adjacent channels.

In order to avoid this crosstalk, it is well known to use an arrangement including two storage capacitors switched on, one for the encoding of the even channels, the other one for the encoding of the odd channels. The voltage VE (see description of the input circuit 100, FIG. 3) is then different according to whether an even channel or an odd channel is encoded.

The centering correction system according to the invention also applies to such an arrangement. It is sufficient to make provision of two centering circuits identical to that described in relation with FIG. 3 one associated with the storage circuit of the even channels, the other with the storage circuit of the odd channels, and the flip-flops 134 alternately receive the correction information. A correction voltage delivered by each one of these centering circuits is then added algebraically to the voltage at the point B (circuit 100 FIG. 3) of the input circuit to which it is associated.

The centering circuit 130 may be utilized with all the types of comparison encoders as well as to the subtraction encoders described in pages 5.54 to 5.60 of the book referenced (*a*).

One of the characteristics which is common to all these types of coders is the fact that they include a comparator delivering a control signal to the decision flip-flop 122. A centering circuit identical to that described in relation with FIG. 3 may be added to these coders. The information of centering correction which is stored in the condenser 137 is used for controlling, in the case of a subtraction encoder, the amplitude of the voltage from which the reference voltage or voltages used for the encoding of the digits of different ranks is (or are) obtained.

As it has been indicated at the beginning of the description, the circuits shown on FIG. 2 may also be used in a PCM communication system in which the time reserved to the synchronizing information is equal to one digit time slot. In fact, only one digit is encoded for the calibration and the circuits 120 and 130 are provided, in said description for delivering the correction information inside this time slot.

While the principles of the above invention have been described in connection with specific embodiments and particular modifications thereof, it is to be clearly understood that this description is made by way of example and not as a limitation of the scope of the invention.

What we claim is:

1. In an encoder, a control arrangement comprising:
first means to produce a plurality of different timing signals in time sequence including a calibration timing signal;
a source of reference voltage;
second means coupled to said first means responsive to said calibration timing signal to provide a calibration voltage of given amplitude;
third means coupled to said first means, said source and said second means activated during said calibration timing signal to compare the value of said reference voltage and said calibration voltage and produce a control signal of given polarity indicating which of said voltages is higher than the other; and
fourth means coupled to said third means and a selected one of said second means and said source responsive to said control signal to adjust the value of one of said voltages to reduce the difference therebetween to a given value.

2. An arrangement according to claim 1, wherein
said third means is activated to produce said control signal by a timing signal defining the time of the most significant digit occurring during said calibration timing signal and the polarity of said control signal is determined by the binary condition of the most significant digit of the coded representation of said calibration voltage.

3. An arrangement according to claim 1, wherein
said fourth means is coupled to said second means to adjust the value of said calibration voltage.

4. An arrangement according to claim 1, wherein
said fourth means is coupled to said source to adjust the value of said reference voltage.

5. An arrangement according to claim 4, wherein
said source includes
a capacitor having the value of the charge thereon adjusted by said fourth means.

6. An arrangement according to claim 1, wherein
said second means includes
an input circuit for said calibration voltage coupled to said third means,
a register coupled to said first means to code said calibration voltage, and
a decoder coupled between said register and said third means.

7. An arrangement according to claim 6, wherein
said fourth means is coupled to said input circuit to adjust the value of said calibration voltage.

8. An arrangement according to claim 6, wherein
said fourth means is coupled to said decoder to adjust the value of the output signal coupled to said third means.

9. An arrangement according to claim 1, wherein
said third means includes
a comparator, and
a first bistable device coupled to the output of said comparator to produce said control signal.

10. An arrangement according to claim 9, wherein
said fourth means includes
a second bistable device coupled to the outputs of said first bistable device.

References Cited

UNITED STATES PATENTS

| | | | |
|---|---|---|---|
| 2,784,396 | 3/1957 | Kaiser et al. | 340—347 |
| 2,836,356 | 3/1958 | Forrest et al. | 340—347 |
| 2,865,564 | 12/1958 | Kaiser et al. | 340—347 |
| 3,017,626 | 1/1962 | Muller | 340—347 |
| 3,105,231 | 9/1963 | Gordon et al. | 340—347 |
| 3,188,455 | 6/1965 | Quick | 340—347 |

MAYNARD R. WILBUR, *Primary Examiner.*

W. J. KOPACZ, *Assistant Examiner.*